(12) United States Patent
Kennedy et al.

(10) Patent No.: US 9,177,207 B2
(45) Date of Patent: Nov. 3, 2015

(54) IMAGE CROPPING USING SUPERVISED LEARNING

(71) Applicant: Yahoo! Inc., Sunnyvale, CA (US)

(72) Inventors: Lyndon Kennedy, San Francisco, CA (US); Roelof van Zwol, Sunnyvale, CA (US); Nicolas Torzec, Sunnyvale, CA (US); Belle Tseng, Cupertino, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 14/599,454

(22) Filed: Jan. 16, 2015

(65) Prior Publication Data

US 2015/0131900 A1    May 14, 2015

Related U.S. Application Data

(63) Continuation of application No. 13/315,066, filed on Dec. 8, 2011, now Pat. No. 8,938,116.

(51) Int. Cl.
| | |
|---|---|
| *G06K 9/00* | (2006.01) |
| *G06T 3/40* | (2006.01) |
| *G06T 11/60* | (2006.01) |
| *G06K 9/46* | (2006.01) |
| *G06K 9/52* | (2006.01) |
| *G06K 9/62* | (2006.01) |

(52) U.S. Cl.
CPC ........ *G06K 9/00711* (2013.01); *G06K 9/00228* (2013.01); *G06K 9/46* (2013.01); *G06K 9/4671* (2013.01); *G06K 9/52* (2013.01); *G06K 9/62* (2013.01); *G06K 9/6201* (2013.01); *G06T 3/40* (2013.01); *G06T 11/60* (2013.01); *G06K 2009/4666* (2013.01)

(58) Field of Classification Search
None
See application file for complete search history.

(56) References Cited

U.S. PATENT DOCUMENTS

| | | | | |
|---|---|---|---|---|
| 5,706,457 | A * | 1/1998 | Dwyer et al. | 715/835 |
| 5,943,679 | A * | 8/1999 | Niles et al. | 715/247 |
| 6,275,829 | B1 * | 8/2001 | Angiulo et al. | |
| 6,964,025 | B2 * | 11/2005 | Angiulo et al. | 715/838 |
| 7,251,790 | B1 * | 7/2007 | Drucker et al. | 715/838 |
| 7,454,711 | B2 * | 11/2008 | Angiulo et al. | 715/760 |
| 7,489,324 | B2 * | 2/2009 | Royal et al. | 345/667 |
| 7,528,846 | B2 * | 5/2009 | Zhang et al. | 345/619 |

(Continued)

OTHER PUBLICATIONS

Kennedy et al., Learning Crop Regions for Content-Aware Generation of Thumbnail Images, ACM, Apr. 2011.*

(Continued)

*Primary Examiner* — Aaron W Carter
(74) *Attorney, Agent, or Firm* — Martine Penilla Group, LLP

(57) ABSTRACT

Software for supervised learning extracts a set of pixel-level features from each source image in collection of source images. Each of the source images is associated with a thumbnail created by an editor. The software also generates a collection of unique bounding boxes for each source image. And the software calculates a set of region-level features for each bounding box. Each region-level feature results from the aggregation of pixel values for one of the pixel-level features. The software learns a regression model, using the calculated region-level features and the thumbnail associated with the source image. Then the software chooses a thumbnail from a collection of unique bounding boxes in a new image, based on application of the regression model. The software uses a thumbnail received from an editor instead of the chosen thumbnail, if the chosen thumbnail is of insufficient quality as measured against a scoring threshold.

20 Claims, 10 Drawing Sheets

(56) References Cited

U.S. PATENT DOCUMENTS

| | | | |
|---|---|---|---|
| 7,747,107 B2* | 6/2010 | Avidan et al. | 382/298 |
| 7,821,545 B2* | 10/2010 | Sato | 348/222.1 |
| 7,912,303 B2* | 3/2011 | Suh | 382/236 |
| 7,945,116 B2* | 5/2011 | Curtis | 382/282 |
| 8,009,921 B2* | 8/2011 | Csurka | 382/228 |
| 8,175,376 B2* | 5/2012 | Marchesotti et al. | 382/159 |
| 8,938,116 B2* | 1/2015 | Kennedy et al. | 382/159 |
| 2002/0054715 A1* | 5/2002 | Os et al. | 382/276 |
| 2003/0137546 A1* | 7/2003 | Suh | 345/838 |
| 2005/0047656 A1* | 3/2005 | Luo et al. | 382/167 |
| 2005/0201628 A1* | 9/2005 | Tojo | 382/239 |
| 2005/0210414 A1* | 9/2005 | Angiulo et al. | 715/838 |
| 2006/0015496 A1* | 1/2006 | Keating et al. | 707/6 |
| 2006/0015497 A1* | 1/2006 | Keating et al. | 707/6 |
| 2007/0070087 A1* | 3/2007 | Sato | 345/619 |
| 2008/0031586 A1* | 2/2008 | Itoh et al. | 386/46 |
| 2008/0046218 A1* | 2/2008 | Dontcheva et al. | 702/186 |
| 2008/0069456 A1* | 3/2008 | Perronnin | 382/228 |
| 2009/0052792 A1* | 2/2009 | Curtis | 382/254 |
| 2009/0164567 A1* | 6/2009 | Hara | 709/203 |
| 2009/0208118 A1* | 8/2009 | Csurka | 382/228 |
| 2010/0226564 A1* | 9/2010 | Marchesotti et al. | 382/159 |
| 2011/0007180 A1* | 1/2011 | Sato | 348/222.1 |
| 2013/0028487 A1* | 1/2013 | Stager et al. | 382/110 |
| 2013/0148880 A1* | 6/2013 | Kennedy et al. | 382/159 |
| 2014/0074759 A1* | 3/2014 | Lewis et al. | 706/12 |

OTHER PUBLICATIONS

Marchesotti et al., "A Framework for Visual Saliency Detection With Application to Thumbnail Images", IEEE, 2009.*

Suh et al., Automatic Thumbnail Cropping and its Effectiveness, ACM, 2003.*

* cited by examiner

IMAGE CROPPING USING SUPERVISED LEARNING

RELATED APPLICATION

The present application is a continuation of U.S. application Ser. No. 13/315,066 which was filed on Dec. 8, 2011, and is also entitled "Image Cropping Using Supervised Learning". The present application claims priority to and/or the benefit of that application. And the disclosure of that application is incorporated by reference herein for all purposes.

BACKGROUND

In many searching or browsing applications, users interact with collections of images, videos, or other content through thumbnail images which communicate to the user the type of content that the user will find upon clicking the thumbnail.

In some instances, a thumbnail might be created by simply resizing a rectangular source image, while maintaining the existing aspect ratio between the height and width of the image. In other instances that occur frequently, the dimensions of the thumbnail are constrained to be a fixed aspect ratio which is different from the aspect ratio of the source image.

Generating the latter type of thumbnail often involves cropping the image so that some of the original content will be omitted. If this crop is not performed carefully, important content (such as a person's face or key text) might be absent from the thumbnail, obscuring the meaning of the original image.

Human editors can perform this cropping, at a cost in terms of both time and expense. To minimize this cost, cropping through automated processes might be used, in a trade-off that tends to result in a thumbnail of lower quality.

SUMMARY

In an example embodiment, a processor-executed method is described for generating thumbnail images. According to the method, software for supervised learning extracts a set of pixel-level features from each source image in a collection of source images. Each of the source images is associated with a thumbnail created by an editor. The software also generates a collection of unique bounding boxes for each source image. And the software calculates a set of region-level features for each bounding box. Each region-level feature results from the aggregation of pixel values for one of the pixel-level features. The software learns a regression model, using the calculated region-level features and the thumbnail associated with the source image. Then the software chooses a thumbnail from a collection of unique bounding boxes in a new image, based on application of the regression model.

In another example embodiment, an apparatus is described, namely, a computer-readable storage medium which persistently stores a program for generating thumbnail images. The program extracts a set of pixel-level features from each source image in a collection of source images. Each of the source images is associated with a thumbnail created by an editor. The program also generates a collection of unique bounding boxes for each source image. And the program calculates a set of region-level features for each bounding box. Each region-level feature results from the aggregation of pixel values for one of the pixel-level features. The program learns a regression model, using the calculated region-level features and the thumbnail associated with the source image. Then the program chooses a thumbnail from a collection of unique bounding boxes in a new image, based on application of the regression model.

Another example embodiment involves a processor-executed method for generating thumbnail images. According to the method, software for supervised learning extracts a set of pixel-level features from each source image in a collection of source images. Each of the source images is associated with a thumbnail created by an editor. The software also generates a collection of unique bounding boxes for each source image. And the software calculates a set of region-level features for each bounding box. Each region-level feature results from the aggregation of pixel values for one of the pixel-level features. The software determines another region-level feature for each bounding box. The software learns a regression model, using the calculated region-level features, the other region-level feature, and the thumbnail associated with the source image. Then the software chooses a thumbnail from a collection of unique bounding boxes in a new image, based on application of the regression model.

Other aspects and advantages of the inventions will become apparent from the following detailed description, taken in conjunction with the accompanying drawings, which illustrate by way of example the principles of the example embodiments.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Figure 1:
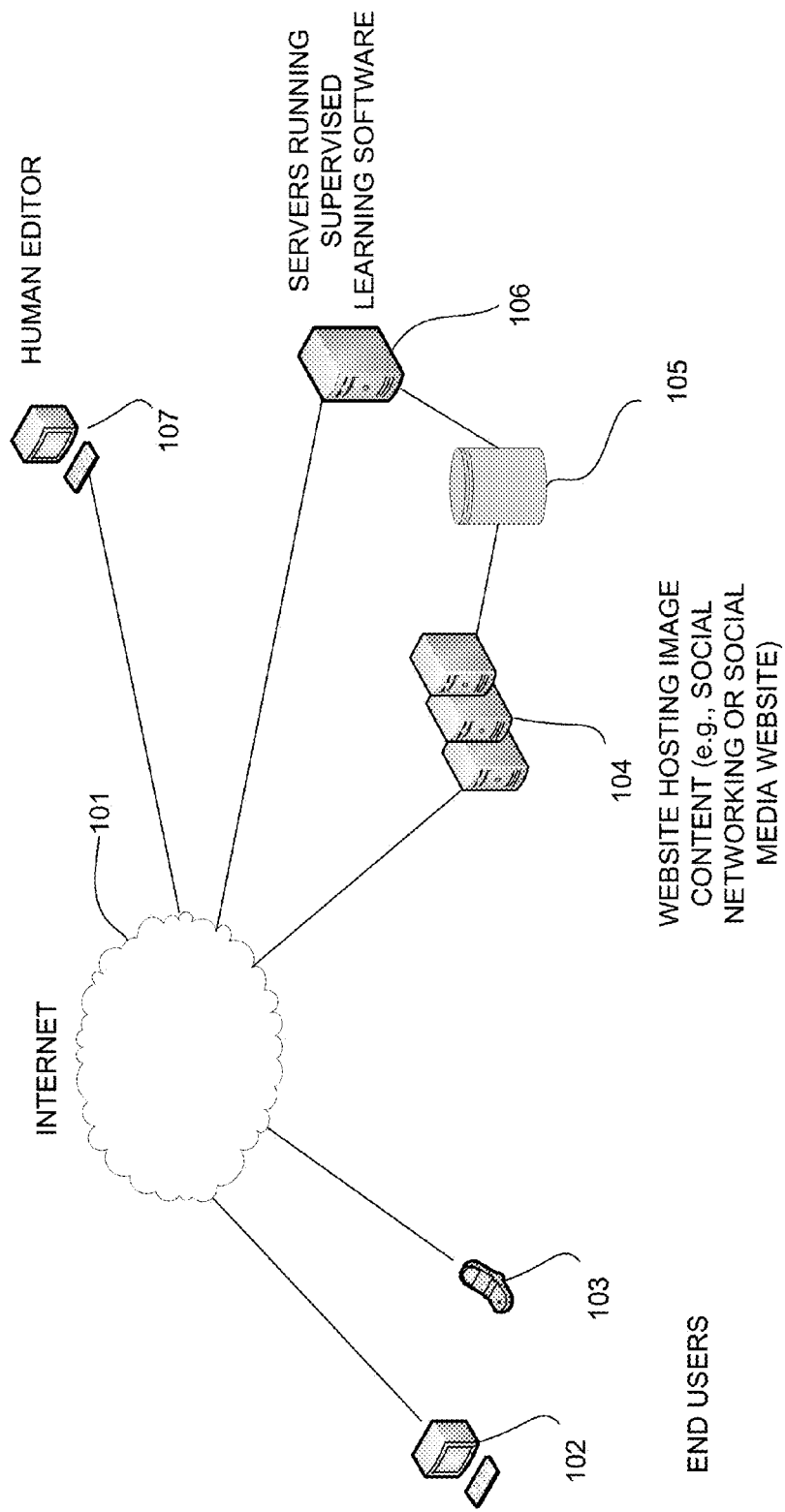
FIG. 1 is a simplified network diagram that illustrates a website hosting image content, in accordance with an example embodiment.

FIG. 1 is a simplified network diagram that illustrates a website hosting image content, in accordance with an example embodiment. As depicted in this figure, a personal computer 102 (e.g., a laptop or desktop computer) and a mobile device 103 (e.g., a smartphone such as an iPhone, Android, Blackberry, etc., or a tablet computer) are connected by a network 101 (e.g., a wide area network (WAN) including the Internet, which might be wireless in part or in whole) with a website 104 hosting image content (e.g., a social networking or social media website). In an example embodiment, personal computer 102 and mobile device 103 might be used by end users who post image content to website 104.

In an example embodiment, the website 104 is composed of a number of servers connected by a network (e.g., a local area network (LAN) or a WAN) to each other in a cluster or other distributed system which might run website software (e.g., web server software, database software, etc.) and distributed-computing and/or cloud software such as Map-Reduce, Google File System, Hadoop, Pig, CloudBase, etc. The servers are also connected (e.g., by a storage area network (SAN)) to persistent storage 105. Persistent storage 105 might include a redundant array of independent disks (RAID). Persistent storage 105 might be used to store data related to the image content and/or the regression model described below.

Also connected to persistent storage 105 are the servers in cluster 106, which might run supervised learning software (e.g., including a regression model) which generates thumbnails (e.g., cropped images) for posted images and/or videos, as described in greater detail below. In an example embodiment, servers in cluster 106 are also connected through network 101 with personal computer 107, which might be used by a human editor, e.g., an editor who crops images to create thumbnails. In an alternative example embodiment, the human editor might use a mobile device, such as mobile device 103. In an example embodiment, the servers in cluster 106 might also run the website, distributed-computing, and/or cloud software described above.

In an alternative example embodiment, the servers in website 104 and in cluster 106 and the storage 105 might be hosted wholly or partially off-site in the cloud, e.g., as a platform-as-a-service (PaaS) or an infrastructure-as-a-service (IaaS).

Personal computers 102 and 107 and the servers in website 104 and cluster 106 might include (1) hardware consisting of one or more microprocessors (e.g., from the x86 family or the PowerPC family), volatile storage (e.g., RAM), and persistent storage (e.g., a hard disk or solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computers 102 and 107 and mobile device 103 might each include a browser as an application program (or mobile app) or as part of an operating system. Examples of browsers that might execute on personal computers 102 and 107 include Internet Explorer, Mozilla Firefox, Safari, and Google Chrome. Examples of browsers that might execute on mobile device 103 include Safari, Mozilla Firefox, Android Browser, Google Search, and Palm webOS Browser. It will be appreciated that users of personal computer 102 and mobile device 103 might use browsers to communicate (e.g., through a graphical user interface or GUI) with website software running on the servers at website 104. Examples of website 104 include a website such as Yahoo! News, Flickr, Facebook, and Google+, among others. Likewise, a human editor using personal computer 107 might use a browser to communicate (e.g., through a GUI) with the supervised learning software running on the servers at cluster 106.

Figure 2:
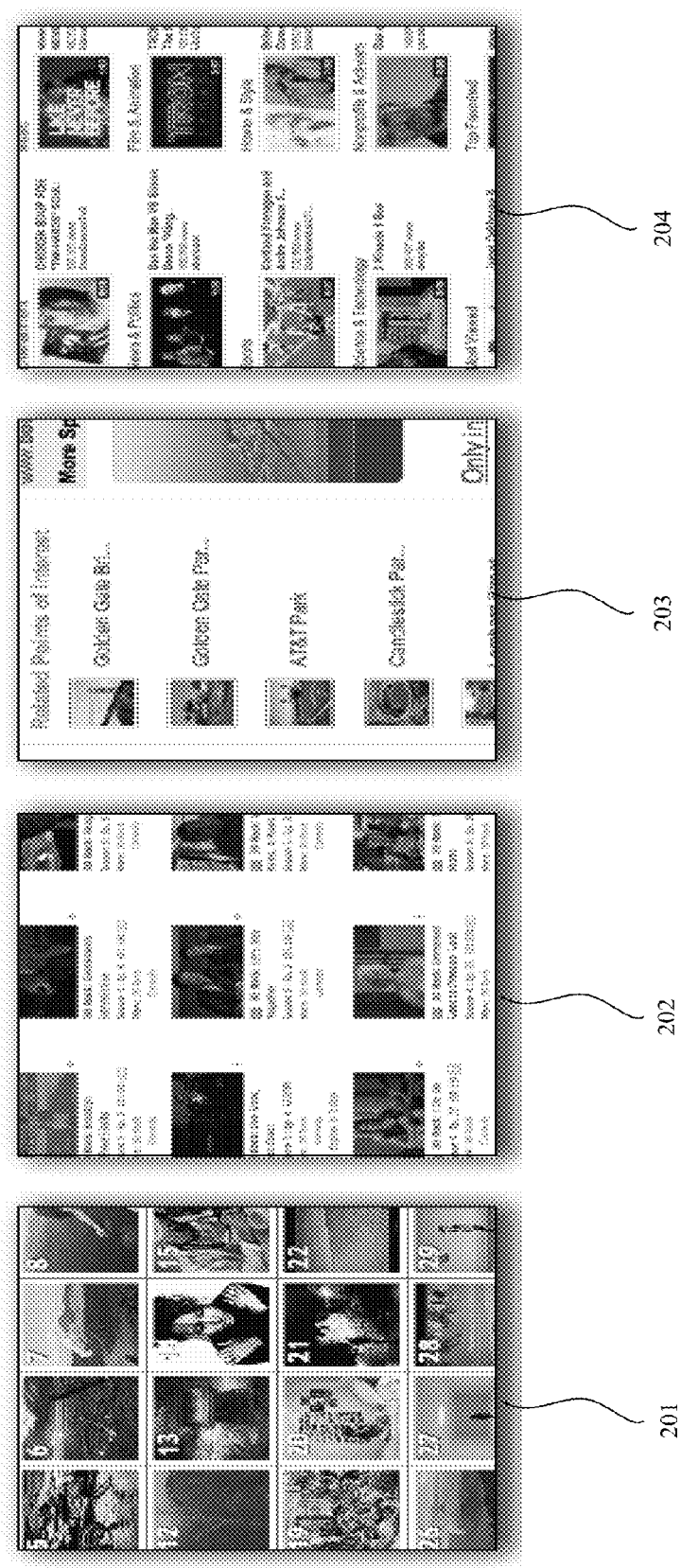
FIG. 2 shows examples of computer-generated thumbnails (e.g., cropped images).

FIG. 2 shows examples of computer-generated thumbnails (e.g., cropped images). The computer-generated thumbnails in 201 were displayed on a Flickr "Explore" webpage. It will be appreciated that Flickr is a social media website that allows for the posting of images. The computer-generated thumbnails in 202 were displayed on a Hulu webpage. It will be appreciated that Hulu is website that makes videos such as television shows and movies available for streaming by users. The computer-generated thumbnails in 203 were displayed on a Yahoo! Search webpage displaying the results for a search entered by a user. It will be appreciated that Yahoo! Search is a search engine which displays image results as well as textual results. The computer-generated thumbnails in 204 were displayed on a YouTube webpage displaying recommended videos. It will be appreciated that YouTube is website that allows users to post videos for streaming by users. In example embodiments, websites similar to each of these websites might use the processes described in greater detail below to generate thumbnails (e.g., cropped images).

Figure 3A:
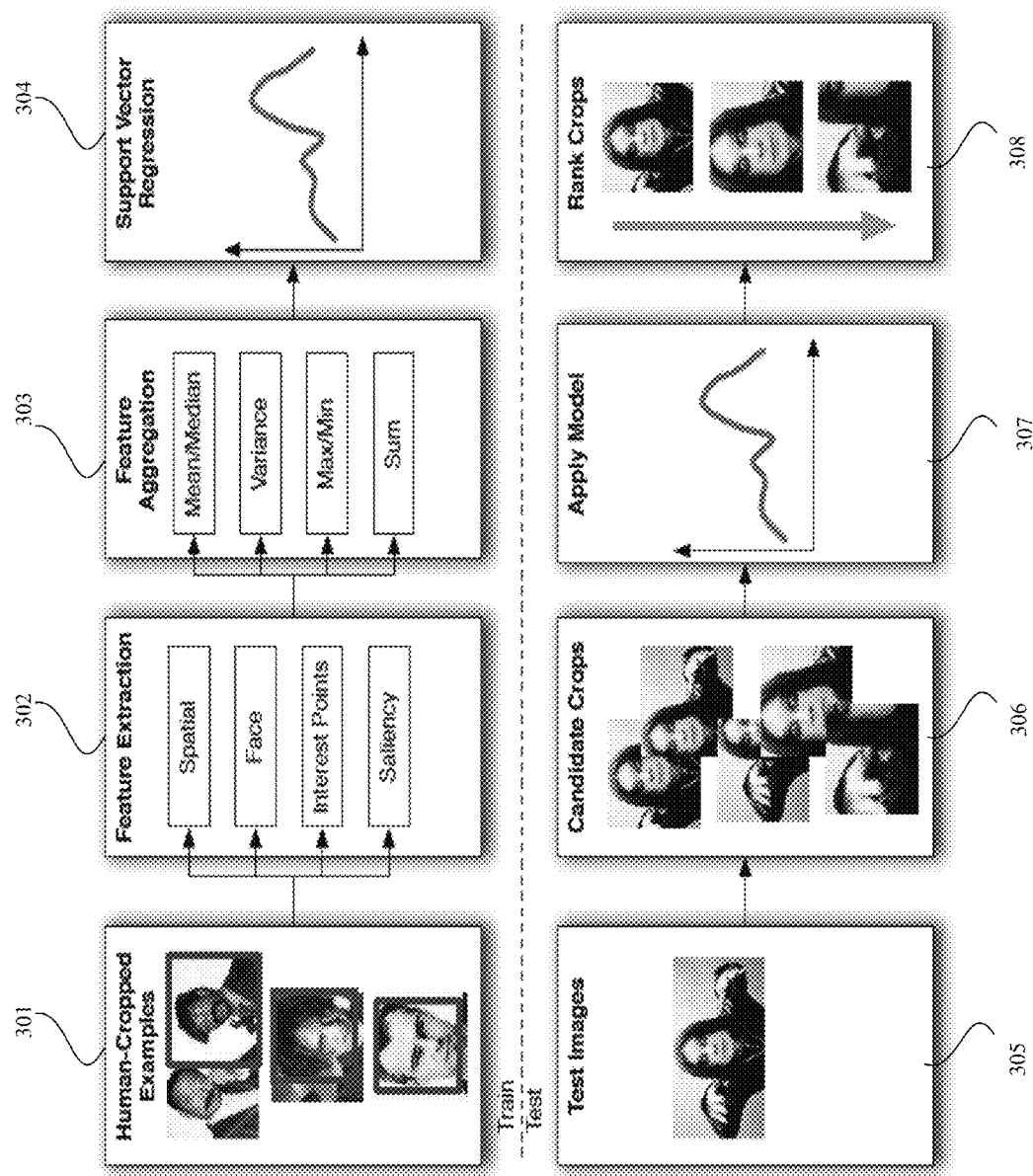
FIG. 3A is a high-level architectural diagram that illustrates a supervised-learning process for generating thumbnails, in accordance with an example embodiment.

FIG. 3A is a high-level architectural diagram that illustrates a supervised-learning process for generating thumbnails, in accordance with an example embodiment. As depicted in the figure, the operations in this process tend to fall into two phases; operations 301-304 involve training a regression model and operations 305-308 involve testing new images against the trained model. In an example embodiment, these operations might be performed offline by the supervised learning software running on cluster 106.

In operation 301, software (e.g., supervised learning software) receives images that were cropped by human editors (e.g., thumbnails), along with the source images for the cropped images. In an example embodiment, both the source images and the cropped images might be square images. In an alternative example embodiment, source and cropped images of other shapes might be received. In operation 302, the software extracts pixel-level features from each of the source images, including features related to: (a) spatial locations; (b) faces; (c) interest points; and (d) saliency. Then in operation 303, the software aggregates the pixel-level features for various unique bounding boxes from each source image. In an example embodiment, the software might aggregate the pixel-level features using random sampling and (a) summation or (b) measures of attributes of central tendency, and dispersion such as: (i) mean; (ii) median; (iii) variance; (iv) maximum; and (v) minimum. The software then inputs these bounding-boxes and their corresponding aggregate measures into a regression model (e.g., a support vector regression model), along with the human-cropped images, in operation 304, which is the last operation of the training phase. As explained in greater detail below, the regression model might use as an objective function a measure of the similarity between each bounding box and the corresponding human-cropped image.

The software receives a test image, in operation 305, the first operation of the testing phase. In operation 306, the software extracts pixel-level features from the test image, generates various unique bounding boxes (or candidate crops), and aggregates the pixel-level features for each bounding box using random sampling and the measures described above. The software then inputs these bounding-boxes and their corresponding aggregate measures into the regression model, in operation 307. The outputs of this operation are objective-function scores that are used to rank the bounding-boxes, in operation 308. In an example embodiment, the top-ranked bounding-box might be chosen as the final crop or thumbnail. In an alternative example embodiment, the ranked bounding boxes might be transmitted to a human editor for final selection of a thumbnail. For further details regarding these training and testing phases, see the article by Kennedy et al., *Learning Crop Regions for Content-Aware Generation of Thumbnail Images*, ICMR '11, Proceedings of the 1st ACM International Conference on Multimedia Retrieval (April, 2011), which is incorporated herein by reference.

Figure 3B:
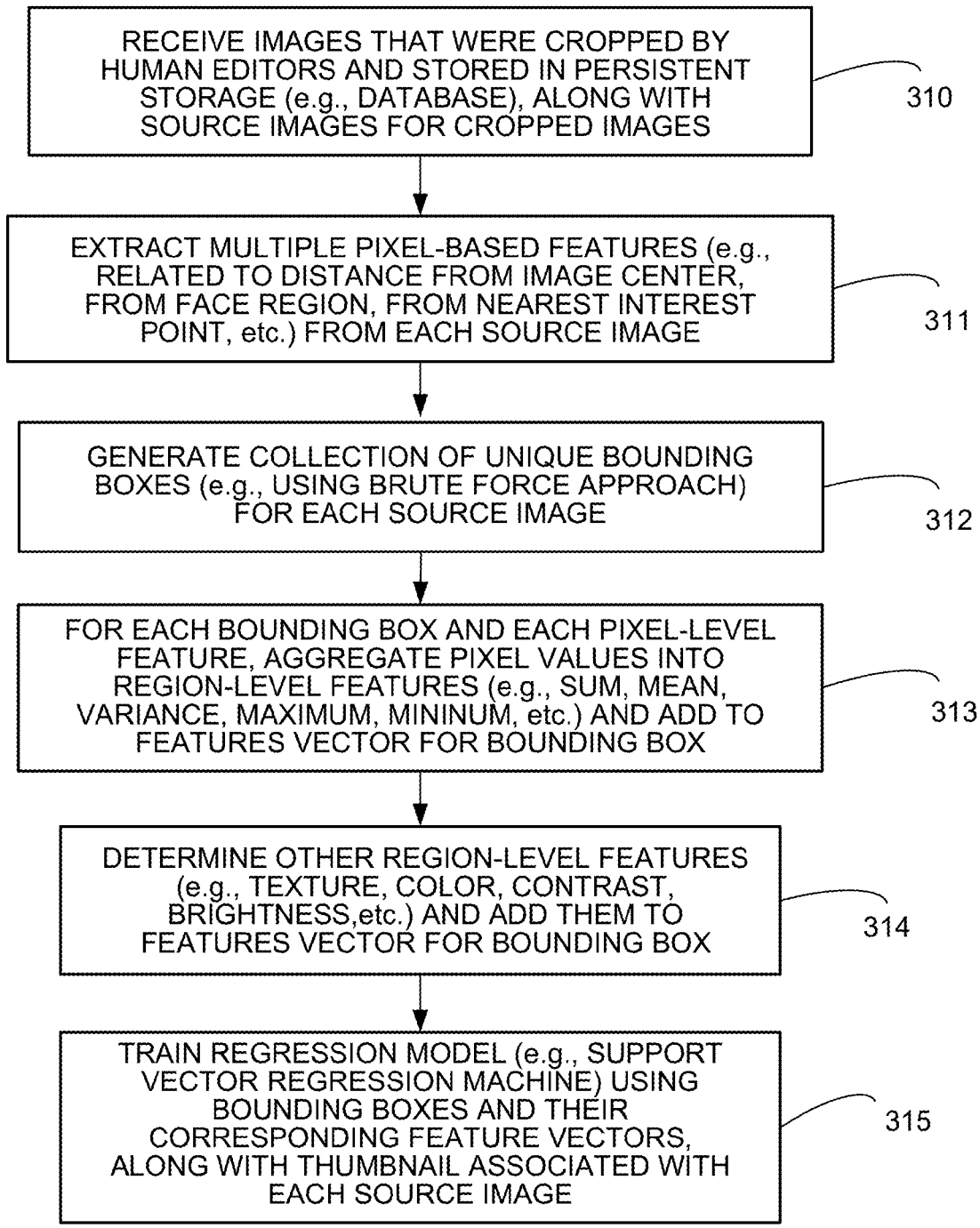
FIG. 3B is a simplified flowchart diagram of a process for training (or learning) a regression model, in accordance with an example embodiment.

FIG. 3B is a simplified flowchart diagram of a process for training (or learning) a regression model, in accordance with an example embodiment. It will be appreciated that this process involves the offline training phase described in FIG. 3A. In an example embodiment, this process might be performed by the supervised learning software running on server cluster 106 with access to the image content and regression models stored in persistent storage 105 and a human editor on personal computer 107. As depicted in FIG. 3B, the software receives images that were cropped by human editors and stored in persistent storage (e.g., a database), along with the source images for the cropped images, in operation 310. In operation 311, the software extracts multiple pixel-based features (e.g., distance from the image center, from a face region, or from a nearest interest point, etc.) from each source image. Then, in operation 312, the software generates a collection of unique bounding boxes for each source image, e.g., using a brute-force approach.

For each of these bounding boxes and each pixel-level feature, the software aggregates pixel values into region-level features (e.g., mean, median, variance, maximum, minimum, sum, etc.) and adds the region-level features to a vector for each bounding box, in operation 313. In operation 314, the software determines other region-level features (e.g., texture, color, contrast, brightness, etc.) and adds them to the features vector for each bounding box. Then in operation 315, the software trains a regression model (e.g., support vector regression machine) using the bounding boxes and their corresponding feature vectors, along with the thumbnail associated with each source image.

Figure 3C:
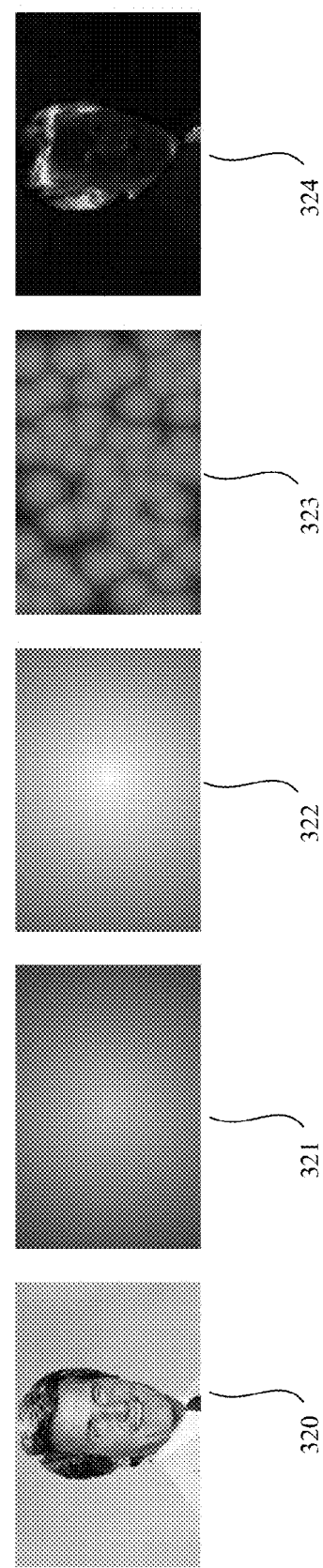
FIG. 3C shows pixel-level features which might be used by a process for training (or learning) a regression model, in accordance with an example embodiment.

As described above, the software extracts multiple pixel-based features from each source image, in operation 311. These pixel-based features might include spatial features, e.g., related to the distance of any given pixel to the center of the image. In an example embodiment, the center of the image might be calculated to be at the coordinate given by half the width of the image and half the height of the image. Each pixel in the image can then be scored by measuring its Euclidean distance from the center. Since image scales vary, the software might normalize each measured distance by the furthest distance possible (e.g., from the center to a corner), so that all the normalized distances lie between 0 and 1. To achieve positively-correlated scores as to which being closer to the center yields a higher score, the normalized distances can be inverted by subtraction from 1. A pictorial representation of such inverted distances for an image is shown as 321 in FIG. 3C, along with the original image 320. Additionally, in an example embodiment, the software might calculate similar distances from the vertical dividing line of the image and from the horizontal dividing line of the image. It will be appreciated that these three distances are inter-related.

Furthermore, in an example embodiment, the pixel-based features might include face features. In an example embodiment, a detector implemented in OpenCV (Open Source Computer Vision Library) might be used to extract face regions. (That detector is based on cascaded boosted classifiers built on top of Haar-like features.) The output of the detector is a set of square bounding boxes for each detected face region. A binary map is then created in which points are set equal to 1 if they are within a face region and set equal to 0 if they are not. It has been empirically observed that the face regions resulting from this detector are tightly bound around the eyes and mouth. However, the cropped images produced by human editors tend to (a) include additional area outside these regions, e.g., areas that include the forehead, hair, and chin, and (b) be centered non-uniformly around the face region. Therefore, instead of measuring a pixel's distance from the face region, the software might measure the distance from the center of the face region and independently measure the distance from each edge of a square box bounding the face region. Since the scale of a face varies from image to image, the distance in pixels might be divided by the width (which is equal to the height) of the square box. The distances might then be normalized to fall between 0 and 1 and inverted through subtraction from 1 to achieve positively-correlated scores as to which being closer to a face region yields a higher score. A pictorial representation of such inverted distances is shown as 322 in FIG. 3C.

Also, in an example embodiment, the pixel-based features might include interest-point features. In an example embodiment, the software might extract interest points with an interest-point detector that uses the "difference of gaussians" approach deployed in scale-invariant feature transform (SIFT) extraction, for example, the interest-point detector in OpenCV. In alternative example embodiments, another suitable interest-point detector might be used. The output of the interest point detector might include a binary pixel map that identifies points of interest. In an example embodiment, software might propagate points of interest to other pixels in the source image by (a) measuring the distance from the pixel to the nearest interest point, (b) normalizing the distance by the longest possible distance in the image (the diagonal) to fall between 0 and 1, and then (c) inverting the normalized distance by subtracting it from 1. A pictorial representation of such inverted distances is shown as 323 in FIG. 3C. Additionally or alternatively, the software might count the number of interest points that fall within a given radius (e.g., equal to 10% of the image's diagonal) of each pixel, to obtain a total local density of interest.

Similarly, in an example embodiment, the pixel-based features might include saliency-map features. In an example embodiment, the software might extract a saliency map using a technique which combines multi-scale image features into a single topographical map of areas of visual interest. For further details as to this technique, see the article by Itti et al., *A model of saliency-based visual attention for rapid scene analysis*, IEEE Transactions on Pattern Analysis and Machine Intelligence, 20(11):1254-1259 (2002). Each pixel in the resulting saliency map has a value between 0 and 1 that can be used without further modification, e.g., normalization or inverting. A depiction of such a saliency map is shown as 324 in FIG. 3C. In an alternative example embodiment, the software might use the saliency detection approach described in the article by Goferman et al., *Context-aware saliency detection*, 2010 IEEE Conference on Computer Vision and Pattern Recognition (CVPR), pages 2376-2383 (2010) or in the article by Wang et al., *Measuring Visual Saliency by Site Entropy Rate*, 2010 IEEE Conference on Computer Vision and Pattern Recognition (CVPR), pages 2368-2375 (2010).

As further described above, the software generates a collection of unique bounding boxes for each source image, in operation 312. It will be appreciated that such a bounding box can be defined by the location of its upper-left corner in the source image and by the bounding box's size. Therefore, in an example embodiment, the software might generate a collection of unique bounding boxes by (a) incrementally increasing the upper-left corner of a bounding box in both a horizontal and vertical direction away from the image origin (e.g., the upper-left corner of the image) and (b) incrementally increasing the size of the bounding box. In an example embodiment, the increment might be set to be 10% of the height or width of the image, whichever is smaller.

Also, in an example embodiment, each of the generated bounding boxes might be square. However, in an alternative example embodiment, the software might use some other pre-defined aspect ratio such as 16:9 or 4:3. Following such an incremental sweep of the image, the software might retain the generated bounding boxes in which all the points within the box are also within the bounds of the image itself. During the training phase, the software might randomly select a certain number of retained bounding boxes from each source image, in order to increase performance. Empirical research indicates that diminishing returns occur for numbers greater than approximately 30. However, during the testing phase, the software might use all of the retained bounding boxes. In an alternative example embodiment, the software might use all the retained bounding boxes during both the training phase and the testing phase.

In an alternative example embodiment, the software might generate the bounding boxes using dynamic-programming sweeps of the source image instead of the brute-force approach described above. Or the software might generate the bounding boxes using grid-oriented sweeps of the source image.

For each of these pixel-level features, a higher pixel value might be thought of as indicating a higher likelihood that the pixel should be included in a thumbnail. Furthermore, an aggregation of such pixel values in a bounding box might be thought of as indicating the relative quality of the bounding box with respect to serving as a thumbnail.

As described above, the software aggregates pixel values into region-level features (e.g., mean, median, variance, maximum, minimum, sum, etc.) and adds them to a features vector, in operation 313. In an example embodiment, the software might begin this aggregation by normalizing each of the pixel-level feature maps described above, so that the values in the map sum to unity. The software might then randomly sample the pixels contained within a bounding box and aggregate a number of statistics over the sampled pixels, namely: mean, median, variance, minimum, maximum, and sum.

Further, as described above, the software determines other region-level features and adds them to the features vector for each bounding box, in operation 314. In an example embodiment, the other region-level features for an image might include features measuring: (a) texture; (b) color (e.g., color histogram); (c) contrast; (d) brightness (or luminosity); (e) number of faces; (f) number of interest points; (g) Boolean values indicating whether the bounding box contains a face, interest point, or text; (h) enumeration or Boolean values indicating location of the bounding box in the image, e.g., center, right, or left; (i) enumeration or Boolean values indicating categories such landscape/cityscape, movie, TV show, album, sports team logo, or sports team picture; or (j) enumeration or Boolean values indicating shapes such as rectangular, square, circle, or triangle. Here again, the software might use normalization, inverting, and random sampling approaches when adding these features to the feature vector for each bounding box.

Figure 3D:
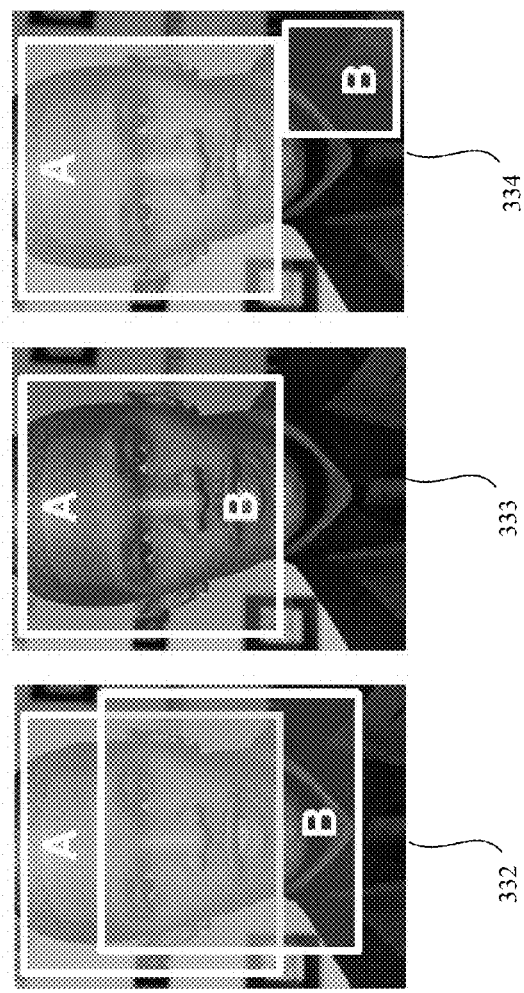
FIG. 3D illustrates a metric for measuring the similarity between two bounding boxes, in accordance with an example embodiment.

As described above, the software trains a regression model (e.g., support vector regression machine) using the bounding boxes and their corresponding feature vectors, along with thumbnail associated with each source image, in operation 315. It will be appreciated that this training involves mapping the features in a feature vector to an objective function. In an example embodiment, the objective function uses a similarity metric based on the extent of overlap between two bounding boxes. Such a metric is shown as 331 in FIG. 3D. Informally, the metric takes the ratio of the area contained within both of the bounding boxes to the area contained by either of the bounding boxes. Formally, if an image is a set of pixels I, bounding box A is the subset of pixels $I_A$ and bounding box B is the subset of pixels $I_B$. The similarity $S_{A,B}$ between the two bounding boxes is the size of the intersection of $I_A$ and $I_B$ divided by the size of the union of $I_A$ and $I_B$, as shown in 332 in FIG. 3D. It will be appreciated that the values of $S_{A,B}$ lie between 0 (if the two bounding boxes are completely disjoint, as shown in 334 in FIG. 3D) and 1 (if the two bounding boxes are identical, as shown in 333 in FIG. 3D). The similarity is symmetric, so $S_{A,B}$ is equivalent to $S_{B,A}$. In an example embodiment, the target (or ground-truth) bounding box might be human-cropped and the candidate bounding box might be machine-cropped, e.g., as described above, when applying this metric. In an alternative example embodiment, both the target bounding box and the candidate bounding box might be human-cropped, e.g., in order to assess inter-editor agreement, when applying this metric.

Also, in an example embodiment, the regression model might be based on support vector regression (SVR) machines, e.g., as implemented using the open-source LibSVM (Library for Support Vector Machines). In an alternative example embodiment, the regression model might be based on regression decision trees, e.g., as implemented using Weka (Waikato Environment for Knowledge Analysis).

Figure 3E:
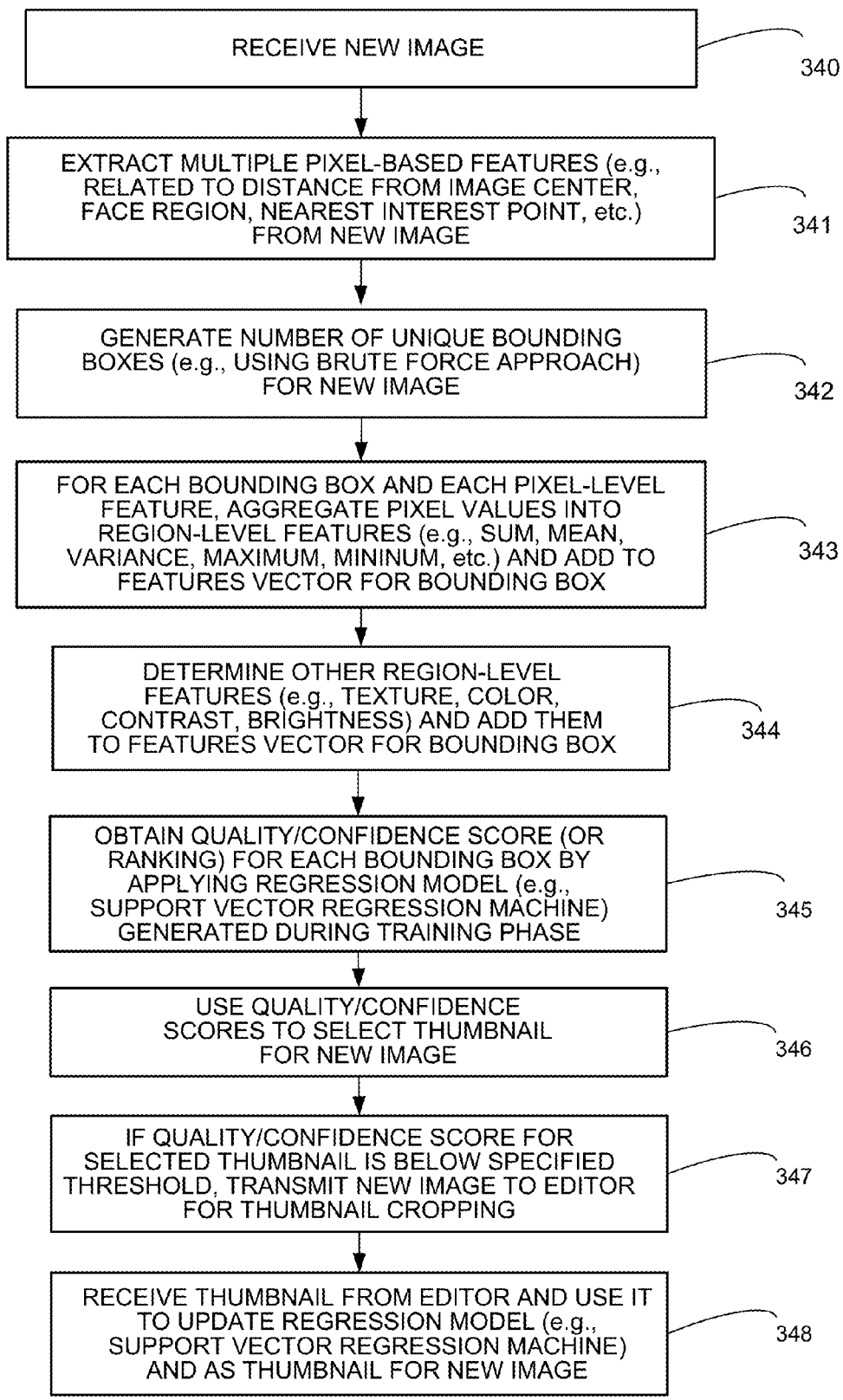
FIG. 3E is a simplified flowchart diagram of a process applying a regression model to generate a thumbnail, in accordance with an example embodiment.

FIG. 3E is a simplified flowchart diagram of a process applying a regression model to generate a thumbnail, in accordance with an example embodiment. It will be appreciated that this process involves testing phase described in FIG. 3A, which might be performed offline in an example embodiment. In an example embodiment, this process might be performed by the supervised learning software running on server cluster 106 with access to the image content and regression models stored in persistent storage 105 and a human editor on personal computer 107. As depicted in FIG. 3E, the software receives a new image, in operation 340. In operation 341, the software extracts multiple pixel-based features (e.g., distance from the image center, from a face region, or from a nearest interest point, etc.) from the new image. Then, in operation 342, the software generates a collection of unique bounding boxes for the new image, e.g., using a brute-force approach, as described above.

For each of these bounding boxes and each pixel-level feature, the software aggregates pixel values into region-level features (e.g., mean, median, variance, maximum, minimum, sum, etc.) and adds the region-level features to a vector for each bounding box, in operation 343. In operation 344, the software determines other region-level features (e.g., texture, color, contrast, brightness, etc.) and adds them to the features vector for each bounding box. Then in operation 345, the software obtains a quality/confidence score (or ranking) for each bounding box by applying the regression model (e.g., support vector regression machine) generated during the training phase. In operation 346, the software uses the quality/ confidence scores (or rankings) to select a thumbnail for the new image (e.g., to display on website 104). If the quality/confidence score for the selected thumbnail is below a specified threshold, the software transmits the new image to an editor for thumbnail cropping, in operation 347. Then in operation 348, the software receives the thumbnail from the editor and uses it to update the regression model (e.g., support vector regression machine) and as the thumbnail for the new image (e.g., to display on website 104).

As described in operation 348, the software transmits the new image to an editor for thumbnail cropping, if the quality/confidence score for the selected thumbnail is below a specified threshold. This transmission might be a push to the editor, if the editor is on staff at the website. Alternatively, this transmission might be a pull by the editor, e.g., from a probabilistic queue, if the editor is a piecemeal contractor, e.g., obtained through a crowdsourcing Internet marketplace such as Amazon's Mechanical Turk.

Similarly, in an alternative example embodiment, a relatively small number of high-scoring bounding boxes might be transmitted to the user who uploaded the new image, for final selection of a thumbnail. And upon receipt of the thumbnail from the user, the software could use it to update the regression model and as the thumbnail for the new image (e.g., to display on website 104).

Figure 4:
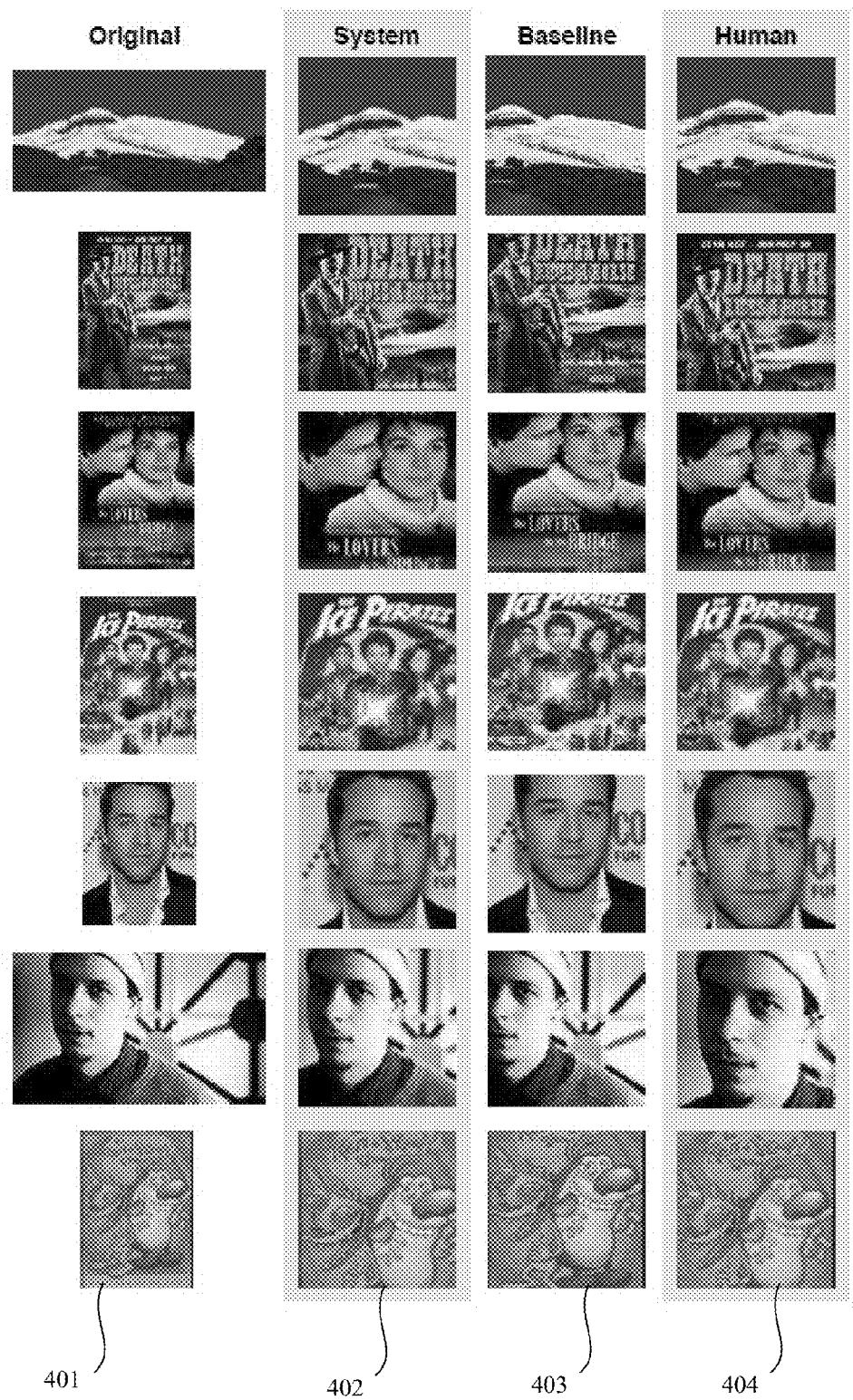
FIG. 4 shows a comparison of thumbnails generated by automated processes and by a human editor.

FIG. 4 shows a comparison of thumbnails (or cropped images) generated by automated processes and by a human editor. Column 401 of this figure shows the source images that were used for the comparison. Column 402 shows the thumbnails (or cropped images) that were generated by the supervised learning software (i.e., system) whose architecture is depicted in FIGS. 3A-3E. It will be appreciated that the aspect ratio of many of the source images differs from the aspect ratio of the thumbnail images. Column 403 shows the thumbnails (or cropped images) that were generated using a baseline approach. In that approach which is referred to as a "center-fit" approach, the software outputs a thumbnail (or cropped image) that is the largest square which will fit in the center of the image by equally removing top and bottom pixels in the case of portrait-oriented images or left and right pixels in the case of landscape-oriented images. Column 404 shows the thumbnails (or cropped images) that were created by human editors; these thumbnails might serve as "ground truth" for evaluating the quality of the other thumbnails. It will be appreciated that with respect to similarity to the "ground truth" thumbnails in column 404, the thumbnails in column 402 tend to be more similar than the thumbnails in column 403, which were produced using the baseline approach.

Figure 5:
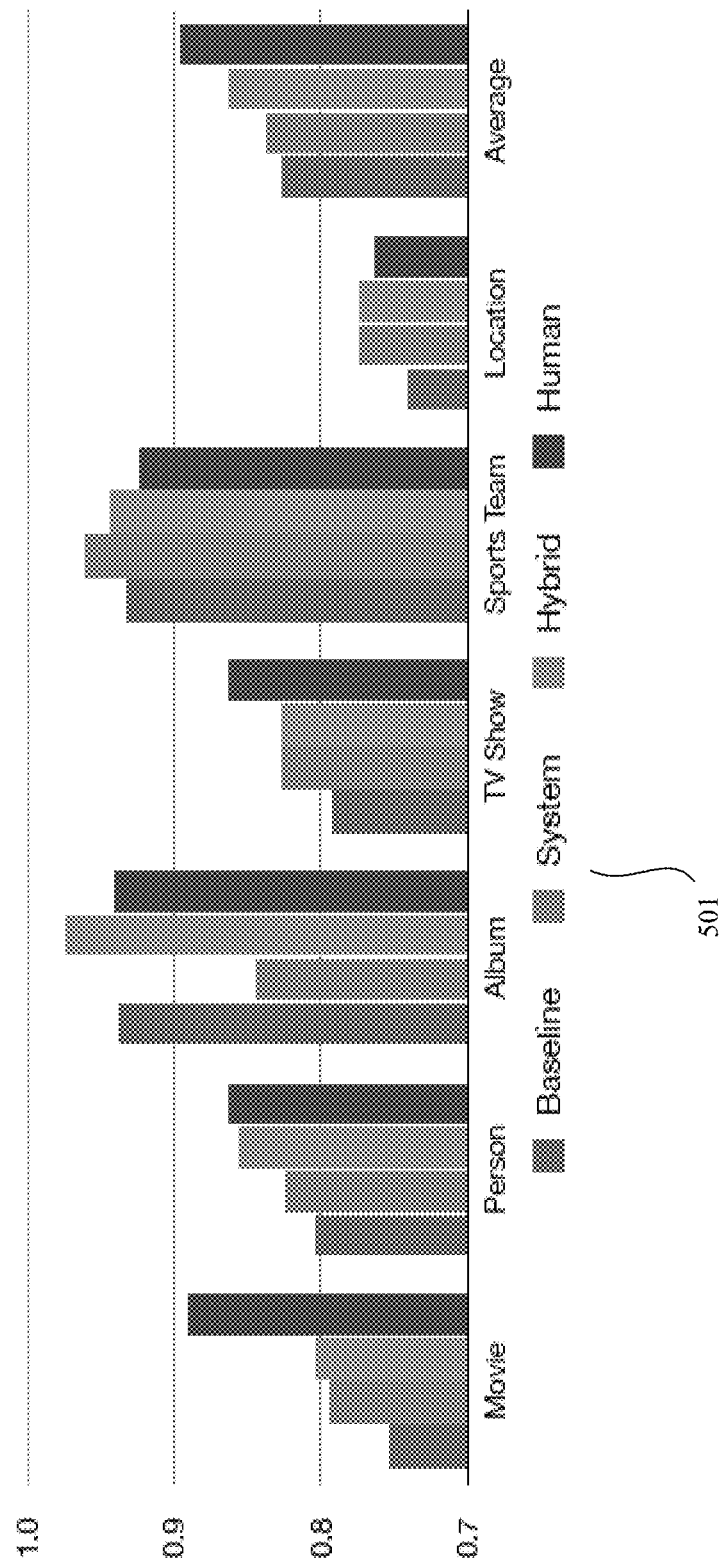
FIG. 5 shows graphs measuring the relative quality of thumbnails generated by automated processes and by a human editor, for various classes of images.

FIG. 5 shows graphs measuring the relative quality of thumbnails (or cropped images) generated by automated processes and by a human editor, for various classes of images. These classes of images are: (a) movie; (b) person; (c) album (e.g., album cover); (d) TV show; (e) sports team (e.g., logo); and (f) location (e.g., a landscape or cityscape). The automated processes are: (1) software that uses the baseline approach described above; (2) the supervised learning software (i.e., system) whose architecture is depicted in FIGS. 3A-3E; and (3) software that uses a hybrid approach. In the hybrid approach (3), if the source image is a square, the baseline approach (1) is used to generate the thumbnail. Otherwise, the supervised learning software (2) is used to generate the thumbnail. In this comparison, the human editor's thumbnails shown in graph 501 are compared against "ground truth" thumbnails created by others, as indicated by the fact that all of the scores in graph 501 are less than 1.0. Graph 501 indicates that the hybrid approach (3) tends to outperform the supervised learning software (2) on most source images and is only exceeded by the human editor.

Figure 6:
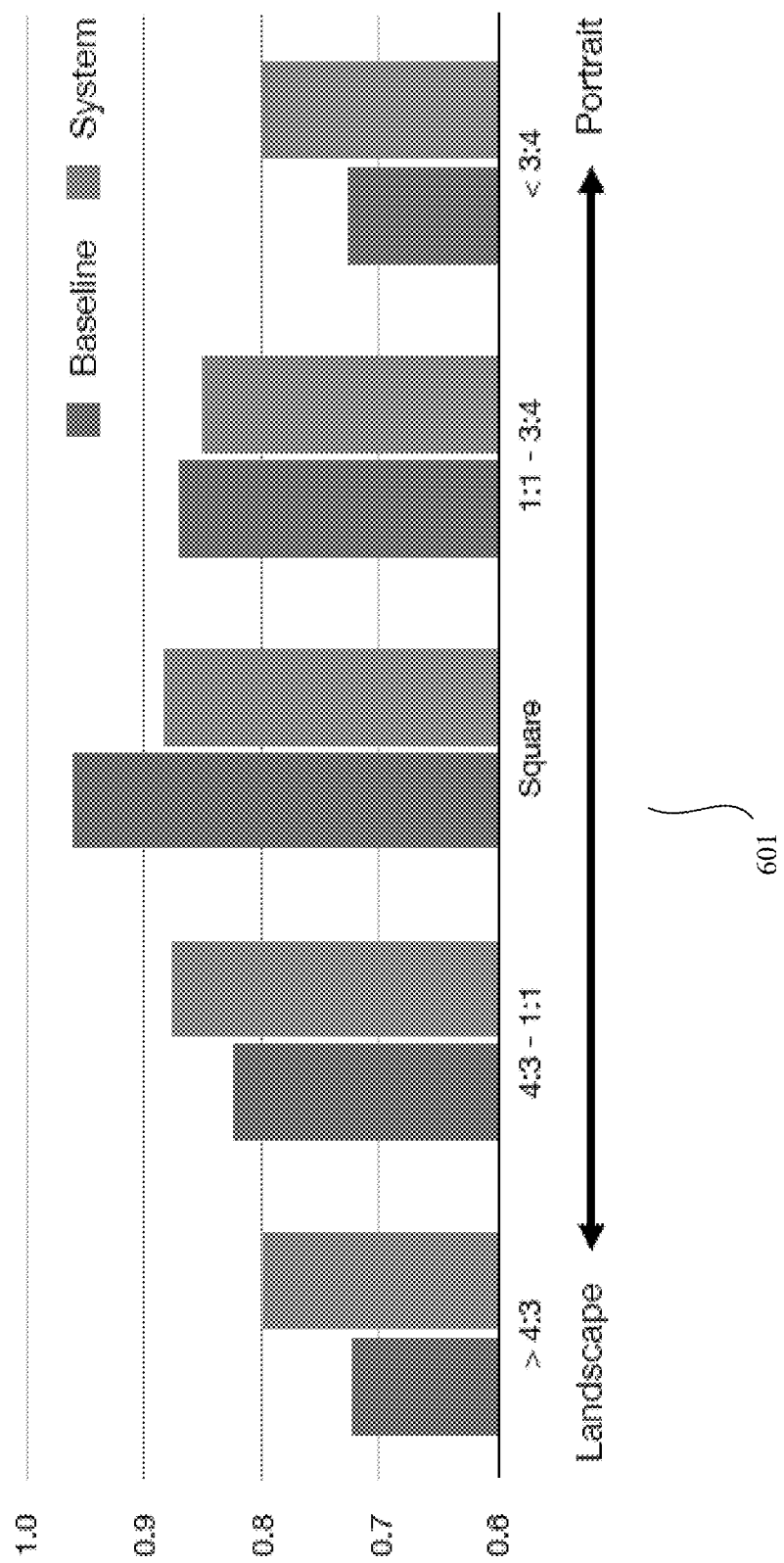
FIG. 6 shows graphs measuring the relative quality of thumbnails generated by automated processes, for various aspect ratios of images.

FIG. 6 shows graphs measuring the relative quality of thumbnails generated by automated processes, for various aspect ratios of images. The aspect ratios are: (a) greater than 4:3; (b); 4:3-1:1; (c) square (1:1); (d)1:1-3:4; and (e) less than 3:4. The automated processes are: (1) software that uses the baseline approach described above; and (2) the supervised learning software (i.e., system) whose architecture is depicted in FIGS. 3A-3E. Graph 601 indicates that the supervised learning software (2) tends to outperform the baseline approach (1) for aspect ratios that do not approximate square.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the processes described above might be used with a binary or multiclass classifier rather a regression model. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method for generating thumbnail images, comprising the operations of:

extracting a plurality of pixel-level features from each of a plurality of source images, wherein each of the source images is associated with a thumbnail created by an editor;

generating a plurality of unique bounding boxes for each source image;

calculating a plurality of region-level features for each bounding box, wherein each region-level feature results from the aggregation of pixel values for one of the pixel-level features;

learning a regression model, using at least the calculated region-level features and the thumbnail associated with the source image;

choosing a thumbnail from a plurality of unique bounding boxes in a new image, based at least in part on application of the regression model; and using a thumbnail received from an editor instead of the chosen thumbnail, if the chosen thumbnail is of insufficient quality as measured against a scoring threshold, wherein a center-fit approach is applied to the source image to obtain a thumbnail, if the source image is approximately square, and wherein each of the operations is executed by one or more processors.

2. The method of claim 1, wherein application of the regression model occurs if the source image is not approximately square.

3. The method of claim 1, wherein learning the regression model includes measuring a similarity between a bounding box in a source image and the thumbnail for the source image.

4. The method of claim 3, wherein measuring the similarity includes calculating a similarity metric based on extent of overlap.

5. The method of claim 1, wherein the operation of choosing a thumbnail from a plurality of unique bounding boxes in a new image includes generating a plurality of bounding boxes for the new image and calculating a plurality of region-level features from pixel-level features for each bounding box.

6. The method of claim 1, wherein the regression model is updated with the received thumbnail.

7. The method of claim 1, wherein the regression model includes a support vector regression machine.

8. The method of claim 1, wherein at least one of the pixel-level features is based on a saliency map.

9. A computer-readable storage medium, that is non-transitory, storing a program, wherein the program, when executed, instructs a processor to perform the following operations:

extract a plurality of pixel-level features from each of a plurality of source images, wherein each of the source images is associated with a thumbnail created by an editor;

generating a plurality of unique bounding boxes for each source image;

calculate a plurality of region-level features for each bounding box, wherein each region-level feature results from the aggregation of pixel values for one of the pixel-level features;

learn a regression model, using at least the calculated region-level features and the thumbnail associated with the source image;

choose a thumbnail from a plurality of unique bounding boxes in a new image, based at least in part on application of the regression model; and use a thumbnail received from an editor instead of the chosen thumbnail, if the chosen thumbnail is of insufficient quality as measured against a scoring threshold, wherein a center-fit approach is applied to the source image to obtain a thumbnail, if the source image is approximately square.

10. The computer-readable storage medium of claim 9, wherein application of the regression model occurs if the source image is not approximately square.

11. The computer-readable storage medium of claim 10, wherein a center-fit approach is applied to the source image to obtain a thumbnail, if the source image is approximately square.

12. The computer-readable storage medium of claim 9, wherein learning the regression model includes measuring a similarity between a bounding box in a source image and the thumbnail for the source image.

13. The computer-readable storage medium of claim 12, wherein measuring the similarity includes calculating a similarity metric based on extent of overlap.

14. The computer-readable storage medium of claim 9, wherein choosing a thumbnail from a plurality of unique bounding boxes in a new image includes generating a plurality of bounding boxes for the new image and calculating a plurality of region-level features from pixel-level features for each bounding box.

15. The computer-readable storage medium of claim 9, wherein the regression model is updated with the received thumbnail.

16. The computer-readable storage medium of claim 9, wherein the regression model includes a support vector regression machine.

17. The computer-readable storage medium of claim 9, wherein at least one of the pixel-level features is based on a saliency map.

18. A method for generating thumbnail images, comprising the operations of:

extracting a plurality of disaggregated features from each of a plurality of source images, wherein each of the source images is associated with a thumbnail created by an editor;

generating a plurality of unique bounding boxes for each source image;

calculate a plurality of region-level features for each bounding box, wherein each of these region-level feature results from the aggregation of values for one of the disaggregated features;

determining another region-level feature for each bounding box;

learning a regression model, using at least the calculated region-level features, the other region-level feature, and the thumbnail associated with the source image;

choosing a thumbnail from a plurality of candidate regions in a new image, based at least in part on application of the regression model; and using a thumbnail received from an editor instead of the chosen thumbnail, if the chosen thumbnail is of insufficient quality as measured against a scoring threshold, wherein a center-fit approach is applied to the source image to obtain a thumbnail, if the source image is approximately square, and wherein each of the operations is executed by one or more processors.

19. The method of claim 18, wherein the other region-level feature is based on a measure of brightness.

20. The method of claim 18, wherein learning the regression model includes measuring a similarity between a bounding box in a source image and the thumbnail for the source image.

* * * * *